United States Patent [19]
Seal

[11] Patent Number: 5,528,529
[45] Date of Patent: Jun. 18, 1996

[54] ELECTRONIC MULTIPLYING AND ADDING APPARATUS AND METHOD

[75] Inventor: David J. Seal, Cambridge, United Kingdom

[73] Assignee: Advanced RISC Machines Limited, Cambridge, United Kingdom

[21] Appl. No.: 303,663

[22] Filed: Sep. 9, 1994

[30] Foreign Application Priority Data

Mar. 2, 1994 [GB] United Kingdom ............... 9403955

[51] Int. Cl.$^6$ .................................................. G06F 7/52
[52] U.S. Cl. ........................................... 364/736; 364/760
[58] Field of Search ................................. 364/736, 760, 364/759

[56] References Cited

U.S. PATENT DOCUMENTS 5,262,976  11/1993  Young et al. ..................... 364/760
5,325,320  6/1994   Chiu ................................. 364/760
5,426,599  6/1995   Machida ........................... 364/760

FOREIGN PATENT DOCUMENTS

WO85/05705  12/1985  WIPO ............................. G06F 7/52
WO86/02181  4/1986   WIPO ............................. G06F 7/48
WO92/08189  5/1992   WIPO ............................. G06F 7/52

*Primary Examiner*—David H. Malzahn
*Attorney, Agent, or Firm*—Albert C. Smith

[57] ABSTRACT

A multiply-accumulate circuit is described in which upon each multiply iteration some of the accumulate value bits are incorporated into the result with lower order subsequently non-changing bits being latched. In this way, a wide accumulate value can be dealt with without incurring a correspondingly wide data path through the multiply accumulate circuit. Initialisation of the multiply accumulate circuit with one of the carry value and save value as the first partial summand and the other as at least part of the accumulate value is performed to reduce the total number of iterative cycles required to produce the result.

23 Claims, 5 Drawing Sheets

ELECTRONIC MULTIPLYING AND ADDING APPARATUS AND METHOD

BACKGROUND OF THE INVENTION

1. Field of the Invention

This invention relates to the field of electronic multiplying and adding within data processing systems.

2. Description of the Prior Art

It is known to provide integrated circuit central processing units with dedicated hardware for performing certain arithmetic operations. Such dedicated hardware is designed to provide higher speed evaluation of certain arithmetic operations than would be available if those arithmetic operations were performed under software control by the general purpose central processing unit core logic.

It is known to provide dedicated hardware units that multiply a M-bit number by another M-bit number to produce a 2M-bit result. In the case of a 32-bit based central processing unit, two 32-bit multiplicands produce a 64-bit result. A more refined arithmetic operation one might wish to perform is multiplying two numbers together and then adding a further number.

In the case of a 32-bit machine, multiplying two 32-bit numbers together and then adding a further 32-bit number can be relatively straightforwardly achieved. However, the result of the multiplication is a 64-bit number and it is desirable that it should be possible to add a 64-bit number to the 64-bit result of the multiplication operation. A problem that arises with this is that a 32-bit machine will have a 32-bit data path structure and expanding this to a 64-bit width to cope with the 64-bit addition will introduce undesirable complication and will require a disadvantageously large amount of circuit area.

SUMMARY OF THE INVENTION

An object of the invention is to provide for the multiplication of an M-bit multiplicand with an N-bit multiplier and adding an (M+N)-bit accumulate value without incurring a disadvantageous increase in data path width.

Viewed from one aspect this invention provides an electronic multiplying and adding apparatus for multiplying an M-bit multiplicand by an N-bit multiplier and adding an (M+N)-bit accumulate value, said apparatus comprising:

(i) means for generating a sequence of partial summands representing multiplication of said M-bit multiplicand and said N-bit multiplier;

(ii) means for carry-save adding at least one of the partial summands to an input carry-save partial result to yield an output carry-save partial result, said input carry-save partial result having active carry bits that are still changing and active save bits that are still changing, a most significant bit of said active save bits having a bit position Z and a least significant bit of said active save bits having a bit position Y; and (iii) means for adding X bits of said (M+N)-bit accumulate value to said input carry-save partial result on a carry-save cycle at bit positions above bit position Z, wherein Z and Y both increase by X between carry-save cycles.

This apparatus allows the adding of the (M+N)-bit accumulate value to proceed at the same time as the multiplication of the M-bit multiplicand by the N-bit multiplier. In this way the provision of a Full (M+N)-bit data path can be avoided. Active carry bits and active save bits are still changing in the sense that new values will be calculated for them rather than allowing them to proceed to final addition unchanged.

In preferred embodiments of the invention in which $X=2$, said means for adding comprises:

means for extending said output carry-save partial result on a carry-save cycle with extension save bits at bit positions $Z+1$ and $Z+2$ and an extension carry bit at bit position $Z+2$, said extension save bits being given by the sum of:
the $Z+1^{th}$ bit of said (M+N)-bit accumulate value;
the complement of the $Z^{th}$ bit of said active carry bits; and
the complement of the $Z+1^{th}$ bit of said partial summand, and said extension carry bit being given by the complement of the $Z+2^{th}$ bit of said (M+N)-bit accumulate value.

Thus, a $Z+1^{th}$ bit and a $Z+2^{th}$ bit of the (M+N)-bit accumulate value are incorporated into the calculation on each iteration of the carry-save addition and so the need for a final (M+N)-bit wide data path to perform an addition after the multiplication operation is avoided. The apparatus of the invention has a bulge in its data path width to accommodate the extra processing to handle the (M+N)-bit accumulate value, but this bulge is relatively small compared to an increase to the full (M+N)-bit width.

It will be appreciated that the means for generating a sequence of partial summands could take many forms depending upon the degree of sophistication desired. However, the number of partial summands generated is reduced when said means for generating comprises a Booth encoder, said sequence of partial summands being a sequence of Booth summands.

Whilst the invention may be applied to any value of M and N, it is most usual to want that M should equal N to provide a general purpose arithmetic processing apparatus.

In the above context, the avoidance of excessively wide data paths becomes particularly advantageous in circumstances when $M=N=32$.

In the case where $M=N$, the data path can be constrained to have an advantageous width of only $M+3$ even though a 2M-bit accumulate value is involved.

The flexibility of the system is improved in embodiments in which the $Z+1^{th}$ bit of the partial summand is either a zero or a sign extension depending upon signed selecting input, said M-bit multiplicand and said N-bit multiplier being treated as unsigned or signed numbers respectively in dependence upon said sign selecting input.

Whilst the invention may be usefully applied in various application specific situations, the invention is particularly suited for use within an integrated circuit central processing unit having a hardware multiplier.

Viewed from another aspect, this invention provides a method of multiplying and adding within an electronic multiplying and adding apparatus for multiplying an M-bit multiplicand by an N-bit multiplier and adding an (M+N)-bit accumulate value, said method comprising the steps of:

(i) generating a sequence of partial summands representing multiplication of said M-bit multiplicand and said N-bit multiplier;

(ii) carry-save adding respective ones of the partial summands to an input carry-save partial result to yield an output carry-save partial result, said input carry-save partial result having active carry bits that are still changing and active save bits that are still changing, a most significant bit of said active save bits having a bit position Z and a least significant bit of said active save bits having a bit position Y; and (iii) adding X bits of said (M+N)-bit accumulate value to said input carry-save partial result on a carry-save cycle at bit positions above bit position Z, wherein Z and Y both increase by X between carry-save cycles.

It is another object of the invention to provide an electronic multiplying and adding apparatus that operates at a high speed. Increases in the speed of operation reduce processing bottlenecks and improve the overall performance of the system of which the multiplying and adding apparatus forms part.

Viewed from a further aspect this invention provides an electronic multiplying and adding apparatus for multiplying an M-bit multiplicand by an N-bit multiplier and adding an (N+M)-bit accumulate value, said apparatus comprising:

(i) means for generating a sequence of partial summands representing multiplication of said M-bit multiplicand and said N-bit multiplier;

(ii) means for carry-save adding at least one of the partial summands to an input carry-save partial result to yield an output carry-save partial result, said input carry-save partial result and said output carry-save partial result each comprising a carry value and a save value; and (iii) means for initialising said carry value and said save value to a respective one of:
at least part of said (N+M)-bit accumulate value; and
a first partial summand.

One of the stages of operation of an electronic multiplying and adding apparatus is the initialisation of that apparatus prior to its main calculating cycle. The invention recognises and exploits that by initialising the carry value and save value appropriately, less calculation needs to be performed during the main calculation operation and so an increase in performance can be achieved. More particularly, by dealing with the first partial summand during initialisation, the number of multiplier iterations may be reduced by one. At first sight, such a reduction by one iteration out of a total number of iterations that may be typically between ten and twenty does not seem too significant. However, if one considers a multiplication operation that requires seventeen iterations, then a reduction of one iteration to sixteen iterations enables the process to be split evenly between four machine cycles with four iterations per machine cycle. The alternatives would be to perform four iterations per machine cycle then an additional iteration in one cycle increasing the total number of cycles required to five, or attempt to increase the number of possible iterations per cycle to five, which would make timing constraints tighter, possibly decrease the maximum clock frequency and make the integrated circuit larger.

In preferred embodiments of the invention said means for generating comprises a modified Booth encoder, said sequence of partial summands being a sequence of modified Booth summands.

In order to deal effectively with both signed and unsigned multiplication, it is preferred that when said N-bit multiplier is signed, respective bits R[a] of an internal multiplier representing said N-bit multiplier are given by:

R[(N−1) to 0] are equal to corresponding bits of said N-bit multiplier, and

R[N] is equal to R[(N−1)] and when said N-bit multiplier is unsigned, respective bits R[a] of an internal multiplier representing said N-bit multiplier are given by:

R[(N−1) to 0] are equal to corresponding bits of said N-bit multiplier, and

R[N] is equal to zero.

In the case of a Booth recoded system where the length of the number to be multiplied by is odd (e.g. N+1 in terms of the above), then particularly simple forms of the first partial summand are available. This first partial summand can accordingly be determined quickly and so avoid unduly delaying initialisation. More particularly, if R[0] is equal to zero, then said first partial summand is initialised to zero and if R[0] is equal to one, then said first partial summand is initialised to a bitwise inverse of said M-bit multiplicand.

More particularly, if R[0] is equal to zero, then said first partial summand should ideally be set to zero, and if R[0] is equal to one, then said first partial summand should ideally be set to minus the M-bit multiplicand.

A preferred initialisation is if R[0] is equal to zero, then said first partial summand is initialised to zero and if R[0] is equal to one, then said first partial summand is initialised to a bitwise inverse of said M-bit multiplicand. However, because the bitwise inverse of the M-bit multiplicand is one less than minus the M-bit multiplicand, this introduces a requirement for later adding an extra 1 if R[0] is one. Preferred embodiments comprise a final adder for adding said carry value and said save value, a carry-in bit for said final adder being set to R[0].

The provision of a final adder to sum the carry value and the save value following the multiplication iterations affords the opportunity to add in the "1" required because a 1's complement was taken rather than a 2's complement without incurring additional overhead. The carry in bit of the final adder would otherwise be unused.

Viewed from a still further aspect this invention provides a method of multiplying and adding within an electronic multiplying and adding apparatus for multiplying an M-bit multiplicand by an N-bit multiplier and adding an (M+N)-bit accumulate value, said method comprising the steps of:

(i) generating a sequence of partial summands representing multiplication of said M-bit multiplicand and said N-bit multiplier;

(ii) carry-save adding respective ones of the partial summands to an input carry-save partial result to yield an output carry-save partial result, said input carry-save partial result and said output carry-save partial result each comprising a carry value and a save value; and (iii) initialising said carry value and said save value to a respective one of:
at least part of said (N+M)-bit accumulate value; and
a first partial summand.

The above, and other objects, features and advantages of this invention will be apparent from the following detailed description of illustrative embodiments which is to be read in connection with the accompanying drawings.

DESCRIPTION OF THE PREFERRED EMBODIMENTS

The described circuits implement a multiply-accumulator that can handle:

(1) Multiplications of N-bit and M-bit numbers to produce an (N+M)-bit product;

(2) Multiply-accumulate operations which multiply together an N-bit number and an M-bit number and add an (N+M)-bit accumulate value to produce an (N+M)-bit result.

The circuits can supply both of these in signed and unsigned variants. The described circuits use the exemplary specific case of N=M=32. (i.e. 32×32→64 multiplications, and 32×32+64→64 multiply-accumulates).

The term "multiplier" is used below both for the multiplier circuit and for one of the two operands to the multiplication. It will be clear which is intended, either from the use of "circuit" or "operand" or from the context.

Multiplication of an M-bit multiplicand D by an N-bit multiplier R is usually performed in hardware as two major steps:

(1) Form a collection of multiples X0*D, X1*D, ..., Xk*D of the multiplicand D such that (a) each multiple can be generated easily; (b) X0+X1+...+Xk=R, which ensures that the sum of X0*D, X1*D, ... and Xk*D is equal to R*D, the desired product.

(2) Add the multiplicand multiples generated by step (1) together.

Stage (1): forming the multiplicand multiples

Stage (1) can be performed in various ways. The simplest is to make k=N−1 (so that there are N multiplicand multiples in total), then let Xi=0 if bit i of R (which will be denoted by R[i] or Ri) is 0 and $Xi=2^i$ if R[i] is 1. Because every Xi is zero or a power of two, the multiplicand multiples Xi*D can be formed easily, by using either zero or the result of shifting D left by i bits.

Since the result of the multiplication is longer than either operand, the Xi*D multiplicand multiples should be created with enough bits to determine all the bits of the product: this requires extending each multiplicand with bits on its left. This is the point at which one may cater for the difference between a signed and an unsigned multiplicand: a signed multiplicand is extended with copies of its sign bit, while an unsigned multiplicand is extended with zeros. This extension of the multiplicand is often physically implemented by just extending it with a single zero or copy of the sign bit, with the understanding that this single extra bit represents the (common) value of all the remaining bits.

Another technique which is sometimes used—e.g. in the multiply instructions of the ARM6 integrated circuit of Advanced RISC Machines Limited—is only to generate the bottom N bits of the product of two N bit numbers. In this case, there is no need to extend the multiplicand in this way: the multiplicand can be treated identically for both signed and unsigned variants of the instruction. Somewhat less obviously, so can the multiplier: the net result is that there is no difference at all between a signed and an unsigned version of the instruction, and so only one instruction needs to be provided.

Dealing with the difference between an unsigned and a signed multiplier R under this scheme is somewhat trickier. First, note that the Xi sum to the unsigned value of R: this scheme is "naturally" an unsigned multiplication algorithm. So what is needed is a way of dealing with a signed multiplier. There are a number of ways of dealing with this, most of which come down to either (a) adjusting the final result by subtracting an extra $2^N * D$ if R is negative; or (b) making Xk be $-2^k$ rather than $+2^k$ if R[k] =1, i.e. if R is negative.

A more sophisticated technique is modified Booth encoding. This comes in two slightly different forms, depending on whether N is even or odd. If N is even, we let k =N/2−1 (so we will form N/2 multiplicand multiplies), and then define:

$$X0 = -2*R[1] + R[0]$$

and:

$$Xi = (-2*R[2*i+1] + R[2*i] + R[2*i-1]) * 2^{(2*i)}$$

for i=1,2, ..., k.

Another way of looking at this is that we extend the multiplier with a single bit R[−1] after the binary point, and set R[−1] to be zero (which leaves the value of the multiplier unchanged). The second formula above can then be applied to the case i=0 as well, and simplifies to the first formula above in that case, i.e. the apparent special case for X0 can be got rid of by this definition or R[−1] as 0).

The sum of the Xi is then equal to the signed value of R:

$Xk + X[k-1] + \ldots + X2 + X1 + X0$ $= -2^{(2*k+1)}*R[2*k + 1] + 2^{(2*k)}*R[2*k] + 2^{(2*k)}*R[2*k - 1]$ $\phantom{=} -2^{(2*k-1)}*R[2*k - 1] + 2^{(2*k-2)}*R[2*k - 2] + 2^{(2*k-2)} *R[2*k - 3]$ $\phantom{=} - \ldots$ $\phantom{=} -32*R[5] + 16*R[4] + 16*R[3]$ $\phantom{=} -8*R[3] + 4*R[2] + 4*R[1]$ $\phantom{=} -2*R[1] + R[0]$ $= -2^{(2*k+1)}*R[2*k + 1] + 2^{(2*k)} *R[2*k]$ $\phantom{=} +2^{(2k-1)}*R[2*k - 1] + 2^{(2*k-2)}*R[2*k - 2]$ $\phantom{=} + \ldots$ $\phantom{=} +32*R[5] + 16*R[4]$ $\phantom{=} +8*R[3] + 4*R[2]$ $\phantom{=} +2*R[1] + R[0]$ $= -2^{(N-1)}*R[N - 1] + 2^{(N-2)}*R[N - 2]$ $\phantom{=} +2^{(n-3)}*R[N - 3] + 2^{(N-4)}*R[N - 4]$ $\phantom{=} + \ldots$ $\phantom{=} +32*R[5] + 16*R[4]$ $\phantom{=} +8*R[3] + 4*R[2]$ $\phantom{=} +2*R[1] + R[0]$ $=$ signed value of R.

Furthermore, each Xi is a power of two times a number from the set {−2, −1, 0, 1, 2}, so must have a value of zero, a power of two or minus a power of two. This makes the multiplicand multiples Xi*D easy to form. They are not quite as easy as for the earlier method, since we have to cope with negative powers of two as well as positive ones, but we get the substantial advantage of only having N/2 multiplicand multiples to add together in the second stage, rather than N of them. Forming a negative multiplicand multiple may be done by shifting the multiplicand to form the corresponding positive multiple, then negating by the "take the 1's complement and add 1" method—except that rather than performing the addition of 1 at this stage, we relegate it to the second stage. We therefore end up with N/2 multiplicand multiples and N/2 single bits (which are zero if the corresponding multiplicand multiple is positive and 1 if it is negative) to add in the second stage; this is still a substantial improvement over N full multiplicand multiples.

If N is odd, we do something very similar, except that K=(N−1)/2 and the formulae for the Xi are:

$$X0 = -[0]$$

and:

$$Xi = (-2*R[2*i] + R[2*i-1] + R[2*i-2]) * 2^{(2*i-1)}$$

For i=1,2, ..., k. (Again, the formula for X0 is not really a special case: we just have to define R[−1]=R[−2]=0 to make the second formula produce the right value).

As well as the fact that modified Booth encoding produces half as many multiplicand multiples to add together, it has another advantage: it naturally treats the multiplier as a signed number rather than an unsigned one. With the earlier technique, we had to deal with a signed multiplier as a special case, because no matter how long we make an unsigned number, it cannot hold a negative signed value. The converse is easier: a signed number of length N+1 bits or more can hold an unsigned value of length N bits (or indeed a signed value of length N bits). So if we want a multiplier circuit that can handle both signed and unsigned 32-bit multipliers, for instance, a 33-bit or longer modified Booth encoder will do the job: all we have to do is extend the multiplier with one or more additional bits at its left end, making these bits zero if the multiplier is to be treated as unsigned and copies of the existing sign bit if the multiplier is to be treated as signed.

Dealing with the difference between a signed and an unsigned multiplicand is still done by the same technique as before.

Other, yet more sophisticated ways to form the multiplicand multiples also exist, which reduce their number yet further at the expense of more complexity.

Stage (2): Adding the multiplicand multiples

After stage (1), we have some fairly large number of multiplicand multiples to add together—e.g. 17 in the case that we are using a 33-bit or 34-bit modified Booth encoder for a circuit that can do both signed and unsigned 32×32 multiplication.

The simplest technique is just to add two of them together, add a third to the sum of the first two, add the fourth to the resulting sum, etc., until we have got the final sum. (Incidentally, each addition can also deal with one of the extra bits generated by the modified Booth encoding, by using it as the carry input to the adder. So we don't need extra additions to cope with these bits). This is similar to the technique used by the ARM6 integrated circuit.

One difference is that we don't generate all the multiplicand multiples at once: instead, we generate them as needed. The other main difference deals with an irregularity in this technique: we have to generate two multiplicand multiples before we can do the first addition, but only one before each of the other additions. This can be (and is) exploited in order to provide a multiply-accumulate function without this irregularity by initialising the "sum so far" to be the accumulate value, then repeatedly generating one multiplicand multiple and adding it into the sum so far. (To get a simple multiplication, we do the same, except that the sum so far is initialised to zero rather than to an accumulate value).

This also completes what was suggested in the previous paragraph: there was in fact one addition too few to deal with all the extra bits from the modified Booth encoder, and now there are the right number.

The main problem with this technique is that each addition takes a substantial amount of time, because of the long carry chain it contains. A good solution to this is "carry-save" addition, which arises from the observation that although adding two numbers and a carry bit to get one number necessarily involves a long carry chain, adding three numbers and a carry bit to get two numbers needn't. Specifically, if we have three numbers X[N:0], Y[N:0] and a carry bit W, we can reduce them to two numbers S[N:0] and C[N+1:0] which add to the same value by simply doing a separate addition of 3 single bits in each bit column:

| | X[N] | X[N−1] | X[N−2]...X[3] | X[2] | X[1] | X[0] |
|---|---|---|---|---|---|---|
| | Y[N] | Y[N−1] | Y[N−2]...Y[3] | Y[2] | Y[1] | Y[0] |
| | Z[N] | Z[N−1] | Z[N−2]...Z[3] | Z[2] | Z[1] | Z[0] |
| | | | | | | W |

------------------------------have same sum as

| | S[N] | S[N−1] | S[N−2]...S[3] | S[2] | S[1] | S[0] |
|---|---|---|---|---|---|---|
| C[N+1] | C[N] | C[N−1] | C[N−2]...C[3] | C[2] | C[1] | C[0] | where:

C[0]=W and for i=0,1, ... N:

(C[i+1],S[i]) is the two bit sum of X[i], Y[i] and Z[i]

Because the calculations are done separately for each column, with no carry chain, this is considerably faster than ordinary addition. (For instance, the multiplication on ARM6 used ordinary addition and managed one of them per clock cycle. An integrated circuit using carry-save addition may manage four or more additions per clock cycle.)

If we have J multiplicand multiples to add, we can use this technique J−2 times to reduce them to just two numbers that we have to add to get the final result. This final addition will require an ordinary addition, but the overall total of J−2 carry-save additions and one ordinary addition is a considerable improvement over the original J−1 ordinary additions.

Some big and expensive multipliers do actually generate all the multiplicand multiples at once. With these, many of the addition delays can be eliminated by doing additions in parallel, at the expense of having a large number of adder circuits. For instance, 17 multiplicand multiples can be reduced to the final product with 5 stages of ordinary addition (the first reduces them to 9 numbers, the second to 5, the third to 3, the fourth to 2 and the fifth to 1) or with 6 stages of carry-save addition and one final ordinary addition (17→12→8→6→4→3→2→1). The time advantage of carry-save addition is less here than it was before, but another advantage of carry-save addition is important here: a carry-save adder is also a lot smaller than an ordinary adder.

However when aiming for a small simple circuit, we don't want to do this sort of parallel addition. The normal approach is similar to that for the ordinary adders: we will initialise the "carry" and "save" values so that their sum is zero (e.g. by initialising them both to zero), then use carry-save additions to add in the multiplicand multiples one by one. At the end, we use a normal addition to form the final sum of the "carry" and "save" values. As before, we can get a multiply-accumulate operation for free, by initialising the "carry" and "save" values so that their sum is the accumulate value—e.g. make one of them zero and the other the accumulate value. Indeed, because there are two values to initialise, we could add in two accumulate values, but this is not very useful: a better way to make use of this second accumulate value slot is described later.

Everything above assumes that we are doing (N+M)-bit additions—e.g. that if we are implementing a 32×32 multiplications, we will be doing 64-bit additions. This is awkward, because it typically results in us needing a datapath section which is twice as wide as the rest of the datapath.

However, if we look at the values we are adding in, we find they only contain a slightly more than M-bit region where the value is "interesting". For instance, consider Xi*D for a modified Booth encoder with N odd. Xi is one of $-2^{(2*i)}$, $-2^{(2*i-1)}$, $0, 2^{(2*i-1)}$ and $2^{(2*i)}$, which correspond to Xi*D being one of:

| Xi | Top N−2*i bits | Middle M+1 bits | Bottom 2*i−1 bits |
|---|---|---|---|
| $-2^{(2*i)}$ | All inverse of multiplicand sign | Inverted multiplicand followed by 1 | All 1, with carry bit of 1 |
| $-2^{(2*i-1)}$ | All inverse of multiplicand sign | Inverted multiplicand sign followed by inverted multiplicand | All 1, with carry bit of 1 |
| 0 | All zero | All zero | All 0, with carry bit of 0 |
| $2^{(2*i-1)}$ | All equal to multiplicand sign | Multiplicand sign followed by multiplicand | All 0, with carry bit of 0 |
| $2^{(2*i)}$ | All equal to multiplicand sign | Multiplicand followed by 0 | All 0, with carry bit of 0 |

Both the top N−2*i and the bottom 2*i−1 bits are not very interesting. In particular, we can add the carry bit into the bottom 2*i−1 bits to get all zeros and the same carry into the middle M+1 bits in each case—i.e. replace the above by:

| Xi | Top N−2*i bits | Middle M+1 bits | Bottom 2*i−1 bits |
|---|---|---|---|
| $-2^{(2*i)}$ | All inverse of multiplicand sign | Inverted multiplicand followed by 1, with carry bit of 1 | All zero |
| $-2^{2*i-1)}$ | All inverse of multiplicand sign | Inverted multiplicand sign followed by inverted multiplicand with carry bit of 1 | All zero |
| 0 | All zero | All zero, with carry bit of 0 | All zero |
| $2^{(2*i-1)}$ | All equal to multiplicand sign | Multiplicand signal followed by multiplicand, with carry bit of 0 | All zero |
| $2^{(2*i)}$ | All equal to multiplicand sign | Multiplicand followed by 0, with carry bit of 0 | All zero |

We then find that we don't need to do the carry-save addition on the bottom 2*i−1 bits: rather than doing a carry-save addition of two values and zero, we can just leave the two values unchanged. Furthermore, provided the top N−2*i bits of the "save" and "carry" values so far are all identical, all of the top N−2*i column additions will be identical, and so we only need one circuit to evaluate them all. As a result, we can do everything with just M+2 column adders (M+1 for the middle M+1 bits plus one for the top N−2*i bits) provided:

(a) We start with the "save" value having its top N bits identical;

(b) We start with the "carry" value having its top N bits identical;

(c) We add in the multiplicand multiples in the order X0*D, Xi*D, X2*D, . . . , xk*D, so that each addition requires a smaller number of identical bits at the top than the previous ones; and (d) We shift our "area of interest" left by 2 bits each iteration, storing away the bits that drop off the bottom end. At the end of the calculation, these bits will form the low ends of the final "carry" and "save" values, while those in the last "area of interest" will form their high ends.

This allows us to implement the main part of the multiplier with just a slight "bulge" in the width of the datapath, not a doubling of its width. The final addition still has to be double width, but can be implemented by two uses of a single width adder, using the technique of using the carry-out bit from the first addition as the carry-in bit to the second addition.

Of the restrictions, the last two are a matter of implementing the circuit correctly. However, the first two mean that any accumulate value may be at most M bits wide if signed, rather than about N+M bits wide. A technique is described below to circumvent this restriction on the accumulate value, allowing the implementation e.g. of a 32×32+ 64 multiply-accumulate instruction rather than just 32×32+ 32.

Figure 1:
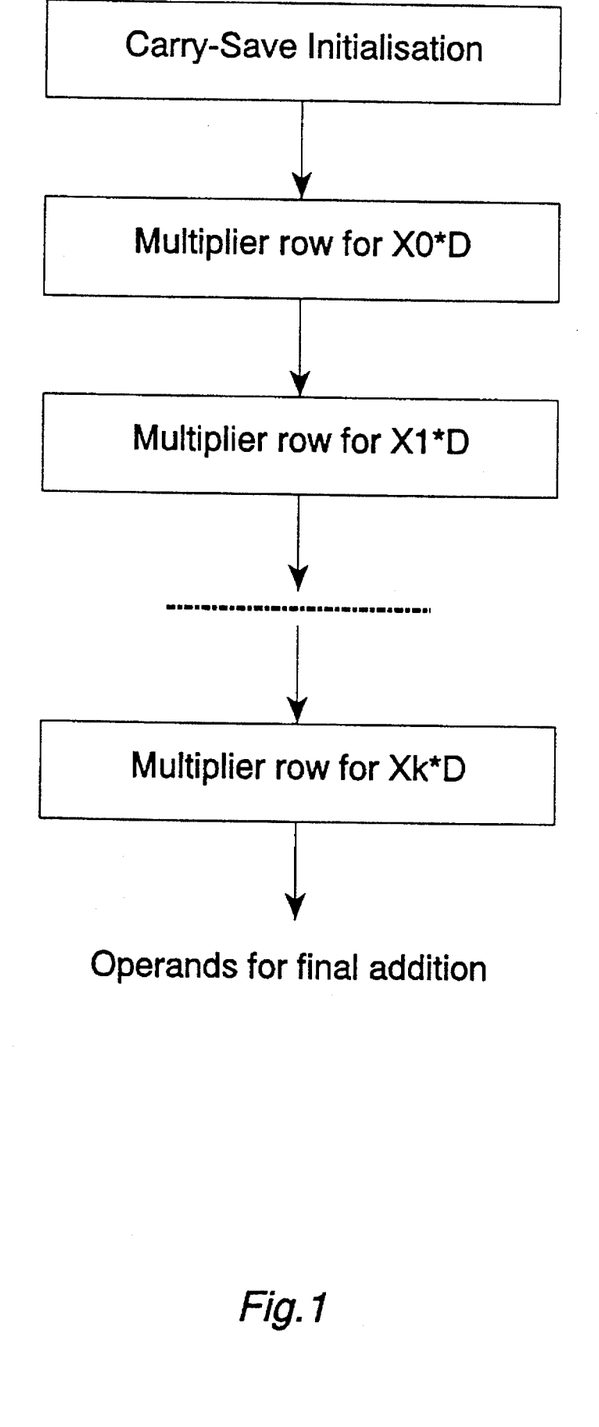
FIG. 1 schematically illustrates a multiplier for determining a multiplication result by producing a sequence of partial summands.

Note that any particular multiplier may contain multiple instances of the hardware which generates a multiplicand multiple and does the carry-save addition into the current "carry" and "save" forms (this hardware will be called a "multiplier row" in what follows). At one extreme, there is the full multiplier array, with a separate multiplier row for each iteration as illustrated in FIG. 1.

Figure 2:
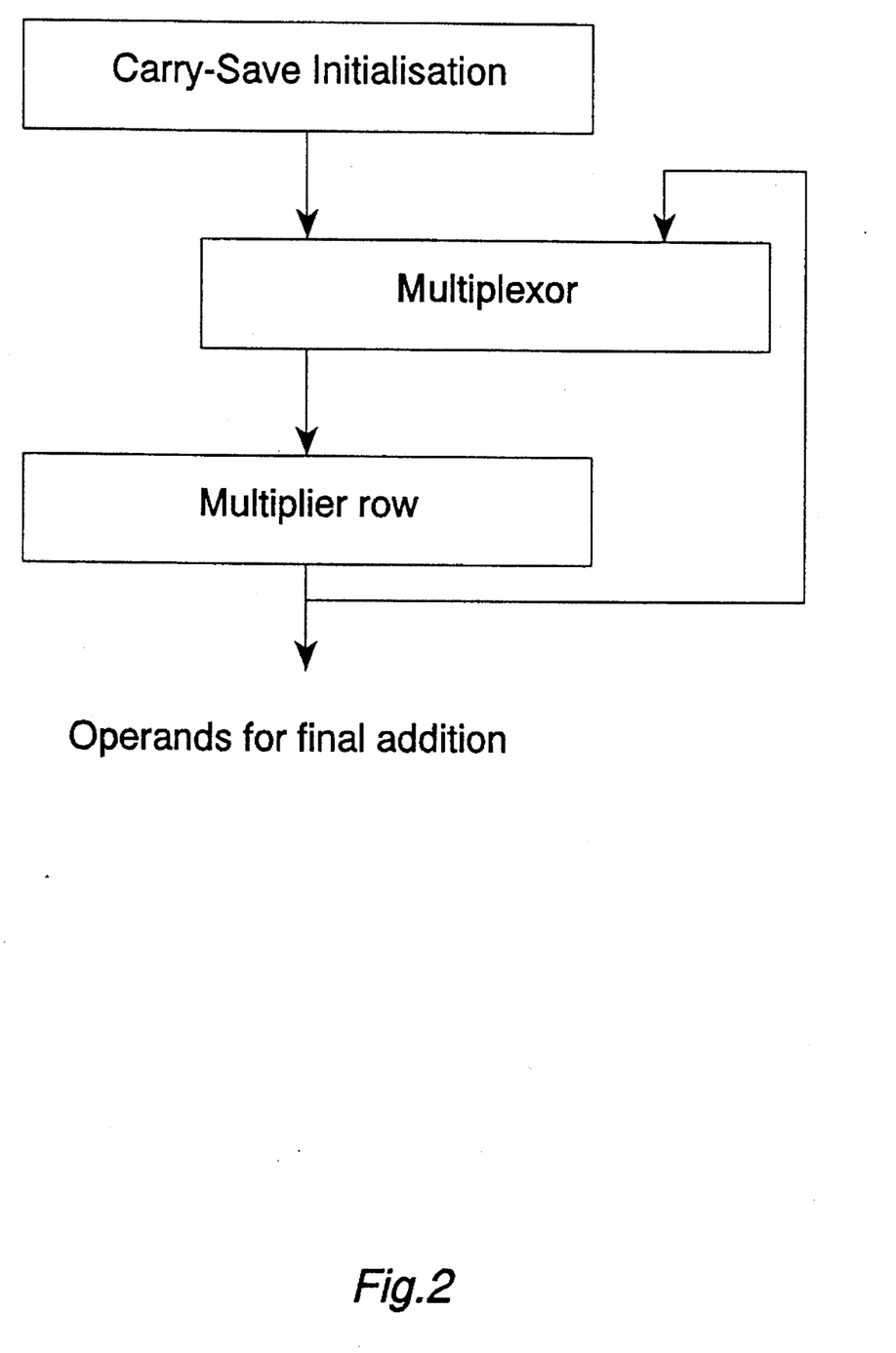
FIG. 2 illustrates a modified version of FIG. 1 in which feedback is employed to re-use a single multiplier row to determine all of the partial summands.

At the other, there is the fully iterative multiplier, with just one multiplier row which handles all the iterations as illustrated in FIG. 2.

Figure 3:
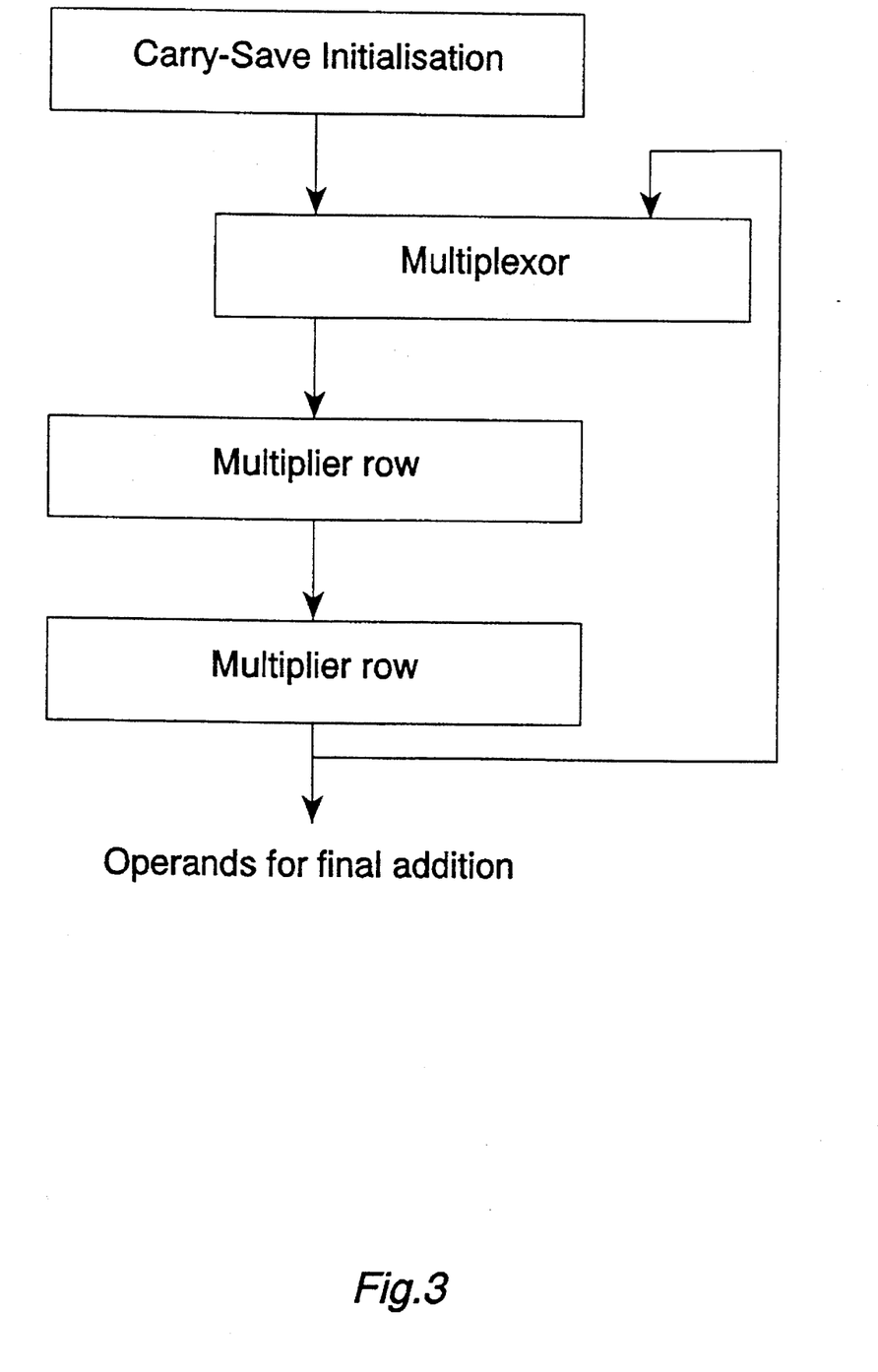
FIG. 3 illustrates a further modification whereby feedback is used in conjunction with a plurality of multiplier rows.

In between, there are iterative versions with more than one row—e.g. the multiplier illustrated in FIG. 3 with two rows.

The choice between the various options above is essentially a space vs. time trade-off: the more multiplier rows you use, the bigger and faster the circuit becomes (it becomes faster because there are fewer multiplexer and latch delays per multiplication, and fewer times that some time may be wasted waiting for the next clock edge to occur). In practice, a common trade-off for reasonably small multipliers is to use the iterative multiplier with the right number of multiplier rows to make the total delay around the loop just less than the required cycle time (or in some cases half the required cycle time, with the circuit being driven by a double-speed clock).

An important point about all this is that essentially the same multiplier row hardware is used in all of these designs: any improvement in multiplier row design applies equally to any of them.

Initialising the carry-save from

As noted above, we can initialise both the "carry" and the "save" part of the carry-save form. One of them is wanted for the accumulate value; the other is simply set to zero. We could use it for one of the multiplicand multiples. The main problem with this is that it means the carry-save form initialiser will have to contain a multiplicand multiple generator. This costs some space: more important, it causes an extra initialisation delay.

The magnitude of this extra delay depends on the complexity of generating the multiplicand multiple concerned.

Looking at the formulae for the Xi generated by modified Booth encoding as set out above, one is particularly simple—namely that for N odd, X0=–R[0]. Typically, of course, we are interested in the N even case; however, as observed above, a good way of dealing with a requirement to multiply by both signed and unsigned N-bit numbers is in fact to multiply by a signed (N+1)-bit number.

These observations lead to the following initialisation method for an M-bit by N-bit multiply-accumulator which handles both signed and unsigned variants, using modified Booth encoding and carry-save addition, and with N even:

Initialise the internal multiplier operand R[N:0] by:
R[N–1:0]=supplied multiplier operand:

$$R[N] = 0 \quad \text{if unsigned variant wanted;}$$
$$= R[N-1] \quad \text{if signed variant wanted.}$$

Initialise one of the "carry" and "save" values to the supplied accumulate value (extended with zeros or copies of the sign bit according to whether it is unsigned or signed).

Initialise the other of the "carry" and "save" values to zero if R[0]=0, and to minus the supplied multiplicand (treated as signed or unsigned as appropriate) if R[0]=1.

This last appears slightly complicated by having to generate minus the supplied multiplicand—i.e. its 2's complement. It would be advantageous to use the trick of forming its 1's component and adding 1 instead. The problem is: when do we add this 1 in?

A good answer is at the end of the multiplication. The reason is that the final addition on the carry-save form currently just needs to add the "carry" and "save" parts of it together. Most adders will add two numbers and a carry bit, and the carry bit is therefore unused. By setting the carry bit equal to R[0], we can compensate for the difference between using the 2's complement and the 1's complement of the multiplicand during initialisation when R[0]=1. So we get the following initialisation method:

Initialise the internal multiplier operand R[N:0] by:
R[N–1:0]= supplied multiplier operand;

$$R[N] = 0 \quad \text{if unsigned variant wanted;}$$
$$R[N-1] \quad \text{if signed variant wanted.}$$

Initialise one of the "carry" and "save" values to the supplied accumulate value (treated as signed or unsigned as appropriate).

Initialise the other of the "carry" and "save" values to zero if R[0]=0, and to the bitwise inverse (i.e. 1's complement) of the supplied multiplicand (treated as signed or unsigned as appropriate) if R[0]=1.

Set the carry-in bit for the final addition to R[0].

The advantage of this technique is that, with little extra initialisation delay and hardware, one stage less of carry-save addition will be required for the main iteration. This may be more significant than it appears at first sight, due to the fact that N is often a power of 2 in real applications. If $N=2^n$, this means that (N+1)-bit modified Booth encoding will generate a total of $2^{(n-1)}+1$ multiplicand multiples and stages of carry-save addition. Reducing this to $2^{(n-1)}$ stages can make it a lot easier to fit the calculation into an exact number of cycles and thus avoid wasting time.

Consider a circuit that needs to do a 32×32 multiplication. With this initialisation, it needs to do 16 stages of carry-save addition, which fits in as 4 cycles, each doing 4 stages. If the carry-save form were just initialised to the accumulate value, 17 stages would be required, which is a much more difficult number to deal with sensibly.

Dealing with a long accumulate value

As stated above, the accumulate value can only be about M bits in length if we are able to represent all the top N–2*i bits at stage i of the multiplication with just a single bit. If the accumulate value is longer the datapath needs to be increased in width substantially to cope with it.

Note that in the top N–2*i bits, we initially only want one of the "carry" and "save" values to be able to contain non-identical bits: the other one can contain all identical bits, as can the top N–2*i bits of the multiplicand multiple. Unfortunately, after the top carry-save addition, both the "carry" and "save" values can contain strings of non-identical bits in their top bits. If this were not the case, and we could arrange that the top bits of the accumulate value were left unchanged by the addition and that the top bits of every other value remained a string of identical bits, we could again do the main work in a roughly M-bit wide datapath: the only difference from the previous state of affairs is that we would have to feed 2 bits of the accumulate value into the main calculation per iteration.

The way we will deal with this is by modifying the simple carry-save "add three bits in each column" technique. In the same way as above, we will split the "carry" and "save" values up into three regions:

(a) A "low" region, in which no further change is going to be made to the "carry" and "save" values. After adding Xi*D into them, this region contains Li bits, where Li =2*i+1 in the N odd case (illustrated in the above) and Li =2*i+2 in the N even case. In the N even case, this can also be expressed by saying that Li=2*i before Xi*D is added; in the N odd case, it can also be expressed by saying that Li=2*i–1 before Xi*D is added, provided a special case is made for i=0 (e.g. by putting the addition of X0*D into the initialisation, as described in the above); SL[Li–1:0]and CL[Li–1:0] denote the low "save" and "carry"bits respectively.

(b) A "middle" or "active" region, in which the main carry-save additions are taking place. This region contains M+1 bits, denoted S[M:0] and C[M:0] for the "save" and "carry" values respectively.

(c) A "high" region, in which the "save" value contains as-yet-unused bits of the accumulate value and the "carry" value is simply a string of copies of C[M]. Before adding Xi*D into the carry save form, this region is 2*(k–1)+2 bits long—i.e. the number of accumulate bits we still want to bring into the active region at 2 bits per addition (recall that k is the index of the last Xi).

As a check, the total length of the "carry" and "save" values is:

when N is even:  $Li + (M + 1) + (2*(k - i) + 2)$
  $= 2*i + M + 1 + 2*k - 2*i + 2$
  $= M + 1 + 2*(N/2 - 1) + 2$
  $= M + N + 1$ when N is odd:  $Li + (M + 1) + (2*(k - i) + 2)$
  $= 2*i + M + 1 + 2*k - 2*i + 2$
  $= -1 + M + 1 + 2*((N - 1)/2) + 2$
  $= M + N + 1$ so we will naturally deal with an accumulate value A[M+N:0]of length M+N+1 bits. (We can of course deal with shorter accumulate values simply by zero-extending them or sign-extending them as appropriate; we can also deal with longer accumulate values, though the excess bits will be completely unchanged by the main operation and simply need to be added to the corresponding "carry" value bits (i.e. copies of C[M]) during the final addition).

So before we add Xi*D into the carry-save form, the "save" and "carry" values will be:

|  | "High" region | "Active" region | "Low" region |
|---|---|---|---|
| "save" value: | A[M+N:Li+M+1] | S[M:0] | SL[Li−1:0] |
| "carry" value: | C[M],C[M], ... C[M] | C[M:0] | CL[Li−1:0] |

Next, we need to look at what the multiplicand multiple is like. We start with an M bit signed or unsigned multiplicand D[M−1:0], which we sign-extend or zero-extend respectively to form an (M+1)-bit signed multiplicand D1[M:0]. When we form the multiplicand multiple as described in the above, we get the following forms for the multiplicand multiple, depending on the value of the "Booth digit" −2*R[2*i+1]+R[2*i]+R[2*i−1] (for N even) or −2*R[2*i]+R[2*i−1]+R[2*i2] (for N odd):

| Booth digit | "High" region | "Active" region | "Low" region |
|---|---|---|---|
| −2 | I[M],I[M], ... ,I[M] | I[M−1:0],1; carry=1 | 0,0, ... ,0 |
| −1 | I[M],I[M], ... ,I[M] | I[M:0]; carry=1 | 0,0, ... ,0 |
| 0 | 0,0, ... ,0 | 0,0, ... 0; carry=0 | 0,0, ... ,0 |
| 1 | D[M],D[M], ... ,D[M] | D[M:0]; carry=0 | 0,0, ... ,0 |
| 2 | D[M],D[M], ... ,D[M] | D[M−1:0],0; carry=0 | 0,0, ... ,0 | where I[M:0] is the bitwise inverse (or 1's complement) of D[M:0]

These are all of the form:

| "High" region | "Active" region | "Low" region |
|---|---|---|
| X[M+1],X[M+1], ... X[M+1] | X[M:0]; carry=XC | 0,0, ... ,0 | for some values of X[M+1:0] and XC. So the addition we wish to perform is of the form:

| "High" region | "Active" region | "Low" region |
|---|---|---|
| A[M+N:Li+m+1] | S[M:0] | SL[Li−1:0] |
| C[M],C[M], ... ,C[M] | C[M:0] | CL[Li−1:0] |
| X[M+1],X[M+1], ... X[M+1] | X[M:0] | 0,0, ... ,0 |
| 0,0, ... ,0 | 0,0, ... ,0,XC | 0,0, ... ,0 |

We wish to end up with "carry" and "save" values of the same form, but with i one greater, and thus Li two greater. In the process, we are going to generate new values for S[M:0] and C[M:0], which will be called S'[M:0] and C'[M:0] respectively. We will also generate SL[Li+1:Li], which are two new bits of SL[], but will not disturb the existing bits SL[Li−i:0]. Similarly, we will generate two new bits CL[Li+1:Li], but will not disturb the existing bits CL[Li−1:0]. Finally, the two lowest bits of A[M+N:Li+M+i] will be consumed, so we want our modified carry-save addition to produce a result of the form:

|  | new "High" region | new "Active" region | new "Low" region |
|---|---|---|---|
| "save" value | A[M+N:Li+M+3] | S'[M:0] | SL[Li+1:0] |
| "carry" value | C'[M],C'[M], ... ,C'[M] | C'[M:0] | CL[LI+1:0] |

Matching the addition we wish to perform up against this, we find we wish our modified carry-save addition to be of the following form:

| "High" region | Transition bits | | "Active" region | Transition bits | | "Low" region |
|---|---|---|---|---|---|---|
| A[M+N:Li+M+3] | A[Li+M+2] | A[Li+M+1] | S[M:2] | S[1] | S[0] | SL[Li−1:0] |
| C[M], ... ,C[M] | C[M] | C[M] | C[M:2] | C[1] | C[0] | CL[Li−1:0] |
| X[M+1], ... X[M+1] | X[M+1] | X[M+1] | X[M:2] | X[1] | X[0] | 0,0, ... ,0 |
| 0, ... ,0 | 0 | 0 | 0, ... ,0 | 0 | XC | 0,0, ... ,0 |
| A[M+N:Li+M+3] | S'[M] | S'[M−1] | S'[M−2:0] | SL[Li+1] | SL[Li] | SL[Li−1:0] |
| C'[M], ... ,C'[M] | C'[M] | C'[M−1] | C'[M−2:0] | CL[Li+1] | CL[Li] | CL[Li−1:0] |

We can immediately eliminate the "low" region because the contribution this region will make to the final sum is unchanged. Similarly, we can eliminate the bits A[M+N:Li+M+3] which appear in the same positions both above and below the line: their contribution to the final form is again obviously unchanged. After this, we find that our modified carry-save addition must be of the form:

| "High" region | Transition bits | | "Active" region | Transition bits | |
|---|---|---|---|---|---|
| 0, ... ,0 | A[Li+M+2] | A[Li+M+1] | S[M:2] | S[1] | S[0] |
| C[M], ... ,C[M] | C[M] | C[M] | C[M:2] | C[1] | C[0] |
| X[M+1], ... X[M+1] | X[M+1] | X[M+1] | X[M:2] | X[1] | X[0] |
| 0, ... ,0 | 0 | 0 | 0, ... ,0 | 0 | XC |
| 0, ... ,0 | S'[M] | S'[M−1] | S'[M−2:0] | SL[Li+1] | SL[Li] |
| C'[M], ... ,C'[M] | C'[M] | C'[M−1] | C'[M−2:0] | CL[Li+1] | CL[Li] |

Next we do some ordinary carry-save addition on the "active" region and the two transition bits below it. By doing the operations:

| | |
|---|---|
| CL[Li] = | XC; |
| (CL[Li+1],SL[Li]) = | two bit sum of S[0], C[0] and X[0]; |
| (C'[0],SL[Li+1]) = | two bit sum of S[1], C[1] and X[1]; |
| For i = 2,3, . . . ,M: | |
| (C'[i−1],S'[i−2]) = | two bit sum of S[i], C[i] and X[i]; | we ensure that S'[M−2:0], SL[Li+1], SL[Li], C'[M−1:0], CL[Li+1] and CL[Li]make the same contribution to the final sum below the line as S[M:0], C[M−1:0], X[M:0], XC and the "active region" copy of C[M]make above the line. So we can now eliminate all of these, together with all the zeros on the line containing XC, and the remainder of our modified carry-save addition must be of the form:

| "High" region | Transition bits | |
|---|---|---|
| 0, . . . ,0 | A[Li+M+2] | A[Li+M+1] |
| C[M]. , , , .C[M] | C[M] | C[M] |
| X[M+1], . . . X[M+1] | X[M+1] | X[M+1] |
| 0, . . . 0 | S'[M] | S'[M−1] |
| C'[M], . . . ,C'[M] | C'[M] | 0 |

At this point, we make some mathematical modifications to this remaining sum. First, we can replace its second line by the sum of the following two lines:

| | | |
|---|---|---|
| 1, . . . ,1 | 1 | 1 |
| 0, . . . ,0 | 0 | NOT(C[M]) |

Proof: if C[M] is 1, this is the sum of a row of all ones and a row of all zeros, which is a row of all ones. Conversely, if C[M]is 0, this is the sum of a row of all ones and a single one at its right hand end. This produces a row of all zeros plus a carry out of the left hand end. The carry out will be ignored, because it is outside the region in which we are doing the addition. So in either case, the sum is a row of copies of C[M].

Similarly, the third line can be replaced by the sum of the following two lines:

| | | |
|---|---|---|
| 1, . . . ,1 | 1 | 1 |
| 0, . . . ,0 | 0 | NOT(X[M+1]) |

This modifies the required carry-save addition to be of the form:

| "High" region | Transition bits | |
|---|---|---|
| 0, . . . ,0 | A[Li+M+2] | A[Li+M+1] |
| 1, . . . ,1 | 1 | 1 |
| 0, . . . ,0 | 0 | NOT(C[M]) |
| 1, . . . ,1 | 1 | 1 |
| 0, . . . 0 | 0 | NOT(X[M+1]) |
| 0, . . . ,0 | S'[M] | S'[M−1] |
| C'[M], . . . ,C'[M] | C'[M] | 0 |

Next, we add the two rows of ones, again ignoring the carry out because it is outside the region in which we are doing the addition. This changes the required carry-save addition to be of the form:

| "High" region | Transition bits | |
|---|---|---|
| 0, . . . ,0 | A[Li+M+2] | A[Li+M+1] |
| 1, . . . ,1 | 1 | 0 |
| 0, . . . ,0 | 0 | NOT(C[M]) |
| 0, . . . ,0 | 0 | NOT(X[M+1]) |
| 0, . . . ,0 | S'[M] | S'[M−1] |
| C'[M], . . . ,C'[M] | C'[M] | 0 |

At this point, if we do the operation:

(S'[M],S'[M−1])=two bit sum of A[Li+M+1], NOT(C[M]) and NOT(X[M+1])

We will find that we can eliminate all these bits from the required addition, together with some zeros, which just leaves:

| "High" region | Transition bit |
|---|---|
| 0, . . . ,0 | A(Li+M+2] |
| 1, . . . ,1 | 1 |
| C'[M], . . . ,C'[M] | C'[M] |

And finally, if we do the operation:

C'[M]=NOT(A[Li+M+2])

we solve this remaining part of the addition sum, by the reverse of the argument which said that we could replace a row of all C[M]s by a row of all 1s and a row containing just NOT(C[M]) in its rightmost position.

Overall conclusion: by performing the set of operations:

| | |
|---|---|
| CL[Li] = | XC; |
| (CL[Li+1],SL[Li]) = | two bit sum of S[0], C[0] and X[0] |
| (C'[0],SL[Li+1]) = | two bit sum of S[1], C[1] and X[1]; |
| For i = 2,3, . . . ,M: | |
| (C'[i−1],S'[i−2]) = | two bit sum of S[i], C[i] and X[i]; |
| (S'[M],S'[M−1]) = | two bit sum of A[Li+M+1], NOT(C[M]) and NOT(X[M+1]) |
| C'[M] = | NOT(A[Li+M+2]) | we can implement a modified carry-save addition for our desired operation:

| "High" region | Transition bits | | Active region | Transition bits | | "Low" region |
|---|---|---|---|---|---|---|
| A[M+N:Li+M+3] | A[Li+M+2] | A[Li+M+1] | S[M:2] | S[1] | S[0] | SL[Li−1:0] |
| C[M], . . . ,C[M] | C[M] | C[M] | C[M:2] | C[1] | C[0] | CL[Li−1:0] |
| X[M+1], . . . X[M+1] | X[M+1] | X[M+1] | X[M:2] | X[1] | X[0] | 0,0, . . . ,0 |
| 0, . . . ,0 | 0 | 0 | 0, . . . ,0 | 0 | XC | 0,0, . . . ,0 |
| A[M+N:Li+M+3] | S'[M] | S'[M−1] | S'[M−2:0] | SL[Li+1] | SL[Li] | SL[Li−1:0] |
| C'[M], . . . ,C'[M] | C'[M] | C'[M−1] | C'[M−2:0] | CL[Li+1] | CL[Li] | CL[Li−1:0] |

Thus, provided we can initialise the "save" and "carry" values correctly, we can perform an M-bit by N-bit multiply-accumulate operation with an (M+N+1)-bit accumulate value, by initialising, adding in multiplicand multiples using the above modified carry-save addition and then doing a final addition on the carry-save value. There are M+4 operations in the list that implement the carry-save addition, so only a slight "bulge" in the datapath is required to do this, and not the doubling of its width that you would normally think was required for the desired operation.

The invention encompasses any multiplier row that implements the above equations, whether it appears in a full array or an iterative multiplier, and no matter how many multiplier rows appear in the array or the iterative loop.

Furthermore, note that no essential change occurs if bits of the same numeric significance exchange roles. For instance, we could exchange the roles of XC and C[0] and of C"[M−1] and S"[M−1] to get the following equations, which would implement the invention just as effectively:

```
CL[i] =                          C[0];
(CL[Li+1],SL[Li]) =              two bit sum of S[0], XC and X[0];
(C'[0],SL[Li+1]) =               two bit sum of S[1], C[1] and X[1];
For i = 2,3, . . . ,M−1:
(C'[i−1],S'[i−2]) =              two bit sum of S[i], C[i] and X[i];
(S'[M−1],S'[M−2]) =              two bit sum of S[M], C[M] and X[M];
(S'[M],C'[M−1]) =                two bit sum of A[Li+M+1], NOT
                                  (C[M]) and NOT(X[M+1])
C'[M] =                          NOT(A[Li+M+2]).
```

The invention may also be applied to some of the more sophisticated ways of generating multiplicand multiples referred to briefly in the above. For instance, another modification of Booth's algorithm might deal with 3 bits of the multiplier per cycle, by making Xn be a power of 2 times one of the number −4, −3, −2, −1, 0, 1, 2, 3 or 4. With such an algorithm, we would have to absorb three bits of the accumulate value into the "active" region each cycle. This could be done in a similar way to above, with the modified part of the carry-save addition being something like:

| "High" region | Transition bits | | | |
|---|---|---|---|---|
| 0,0, . . . ,0 | A[Li+M+3] | A[Li+M+2] | A[Li+M+1] | |
| C[M]. , , , .C[M] | C[M] | C[M] | C[M] | |
| X[M+1], . . . X[M+1] | X[M+1] | X[M+1] | X[M+1] | |
| 0, . . . ,0 | A[Li+M+3] | A[Li+M+2] | A[Li+M+1] | |
| 1, . . . ,1 | 1 | 1 | 1 | |
| 0, . . . ,0 | 0 | 0 | NOT(C[M]) | |
| 1, . . . ,1 | 1 | 1 | 1 | |
| 0, . . . ,0 | 0 | 0 | NOT(X[M+1]) | |
| 0, . . . ,0 | A[Li+M+3] | A[Li+M+2] | A[Li+M+1] | |
| 1, . . . ,1 | 1 | 1 | 0 | |
| 0, . . . ,0 | 0 | 0 | NOT(C[M]) | |
| 0, . . . ,0 | 0 | 0 | NOT(X[M+1]) | |
| 0, . . . ,0 | S'[M+1] | S'[M] | S'[M−1] | |
| C'[M+1], . . . ,C'[M+1] | C'[M+1] | C'[M] | 0 | | with

C'[M+1]=NOT (A[Li+M+3]),

S'[M+1:M] being the 2-bit sum of A[Li+M+2], 1 and 0 (i.e. S'[M+1]=A[Li+M+2], S'[M]=NOT(A[Li+M+2])), and (C'[M],S'[M−1]) being the 2-bit sum of A[Li+M+1], NOT(C[M])

and NOT(X[M+1]), rather than:

| "High" region | Transition bits | | |
|---|---|---|---|
| 0, . . . ,0 | A[Li+M+2] | A[Li+M+1] | |
| C[M]. , , , .C[M] | C[M] | C[M] | |
| X[M+1], . . . X[M+1] | X[M+1] | X[M+1] | |
| 0, . . . ,0 | A[Li+M+2] | A[Li+M+1] | |
| 1, . . . ,1 | 1 | 1 | |
| 0, . . . ,0 | 0 | NOT(C[M]) | |
| 1, . . . ,1 | 1 | 1 | |
| 0, . . . ,0 | 0 | NOT(X[M+1]) | |
| 0, . . . ,0 | A[Li+M+2] | A[Li+M+1] | |
| 1, . . . ,1 | 1 | 0 | |
| 0, . . . ,0 | 0 | NOT(C[M]) | |
| 0, . . . ,0 | 0 | NOT(X[M+1]) | |
| 0, . . . 0, | S'[M] | S'[M−1] | |
| C'[M], . . . ,C'[M] | C'[M] | 0 | | with C'[M]=NOT(A[Li+M+2]) and S'[M:M−1] being the 2-bit sum of A[Li+M+1], NOT(C[M]) and NOT(X[M+1]).

An example multiplier will now be described which uses the above to yield 32×32→64 multiplications and 32×32+ 64→64 multiply-accumulate operations in both signed and unsigned versions.

Further possible refinements not illustrated in this example would be:

Early termination, which essentially involves detecting when all the remaining multiplicand multiples will be zero (so that no more additions are actually required), then doing some rather messy rearrangement of the bits in the "low", "active" and "high" regions in order to produce the correct final additions.

Avoiding the need for the final adder in this circuit, by using another adder which may be present on the datapath anyway, e.g. as part of an ALU.

One could take advantage of the fact that the "save low latches" fill from the bottom up at 2 bits/multiplier row, while the "accumulate value high latches" empty from the bottom up at the same rate, to use the same physical register to hold both values. At the start, it contains the high part of the accumulate value; at the end, it contains the low part of the "save" value; in between, it contains the as-yet-unconsumed high accumulate value bits and the so-far-generated low "save" value bits. This is a useful improvement to the circuit.

Figure 4A:
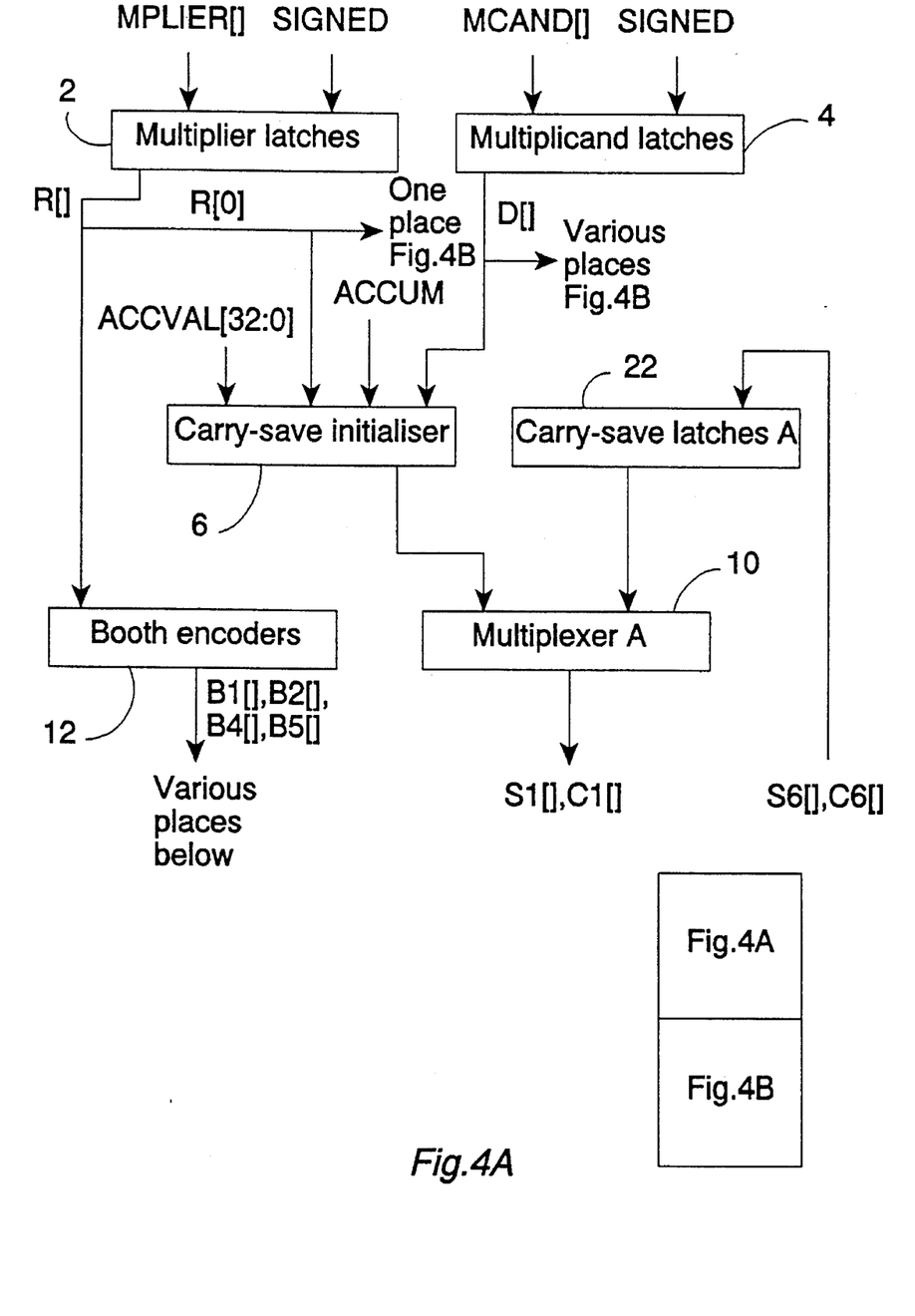
FIGS. 4A and 4B illustrate different portions of a circuit for performing a multiply-accumulate operation.
Figure 4B:
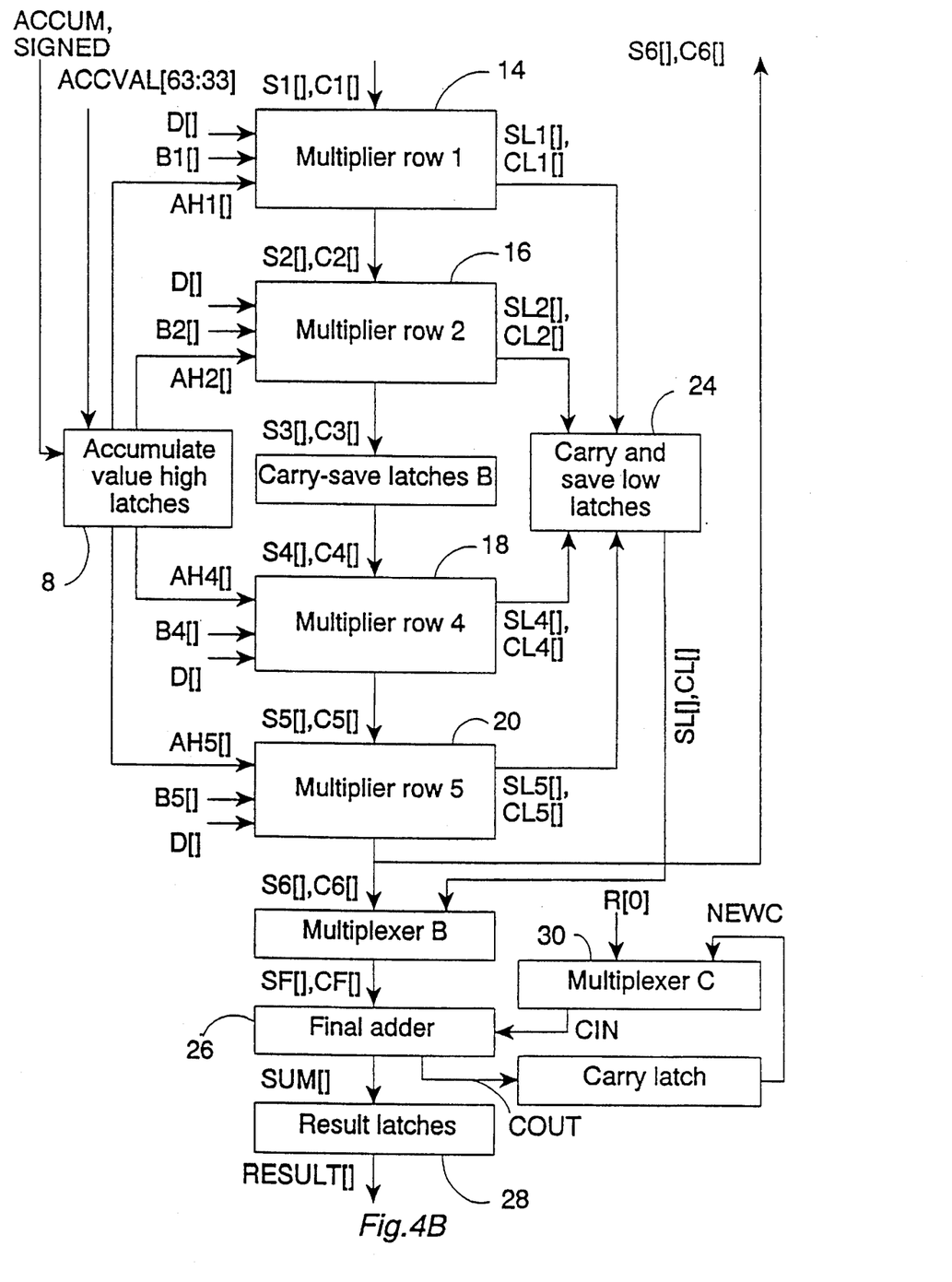

The multiplier uses the following inputs:

| | |
|---|---|
| MPLIER[31:0] | the multiplier operand; |
| MCAND[31:0] | the multiplicand operand; |
| ACCVAL[63:0] | the accumulate value; |
| SIGNED | a single bit which is 1 if a signed operation is to be performed, 0 if an unsigned operation is to be performed; |
| ACCUM | a single bit which is 1 if a multiply-accumulate is to be performed, 0 if just a multiply is to be performed. | plus control inputs to cause the correct sequence of events to occur. The circuit produces RESULT[63:0]as its result. A basic block diagram of this multiplier is as shown in FIG. 4A and 4B (for the sake of clarity, the control signals are not shown):

This multiplier calculates MPLIER[31:0]*MCAND [31:0]+ACCVAL[63:0]in five cycles, with the various blocks performing the following functions on each cycle:

Multiplier latches

| | |
|---|---|
| Cycle 1: | R[31:0] = MPLIER[31:0] |
| | R[32] = SIGNED AND MPLIER[31] |
| Cycles 2–5: | No change |

Multiplicand latches

| | |
|---|---|
| Cycle 1: | D[31:0] = MCAND |
| | D[32] = SIGNED AND MCAND[31] |
| Cycles 2–5: | No change |

Carry-save initialiser

| | | |
|---|---|---|
| Cycle 1: | For i=0,1, . . . ,32: | SI[i] = ACCUM AND ACCVAL[i] |
| | | CI[i] = R[0] AND NOT (D[i]) |
| Cycles 2–5: | No change | |

Carry-save latches A

| | |
|---|---|
| Cycles 1–3: | On phase 2, S0[32:0] and C0[32:0] are loaded from S6[32:0] and C6[32:0] respectively |
| Cycles 4–5: | No change |

Carry-save latches B

| | |
|---|---|
| Cycles 1–4: | On phase 1, S4[32:0] and C4[32:0] are loaded from S3[32:0] and C3[32:0] respectively |
| Cycle 5: | No change |

Multiplexer A

| | |
|---|---|
| Cycle 1: | S1[32:0] = SI[32:0] |
| | C1[32:0] = CI[32:0] |
| Cycles 2–5: | S1[32:0] = S0[32:0] |
| | C1[32:0] = C0[32:0] |

Booth encoders

| | |
|---|---|
| Cycle 1: | B1[4:0] = BoothEnc(R[2:0]) |
| | B2[4:0] = BoothEnc(R[4:2]) |
| | B4[4:0] = BoothEnc(R[6:4]) |
| | B5[4:0] = BoothEnc(R[8:6]) |
| Cycle 2: | B1[4:0] = BoothEnc(R[10:8]) |
| | B2[4:0] = BoothEnc(R[12:10]) |
| | B4[4:0] = BoothEnc(R[14:12]) |
| | B5[4:0] = BoothEnc(R[16:14]) |
| Cycle 3: | B1[4:0] = BoothEnc(R[18:16]) |
| | B2[4:0] = BoothEnc(R[20:18]) |
| | B4[4:0] = BoothEnc(R[22:20]) |
| | B5[4:0] = BoothEnc(R[24:22]) |
| Cycle 4: | B1[4:0] = BoothEnc(R[26:24]) |
| | B2[4:0] = BoothEnc(R[28:26]) |
| | B4[4:0] = BoothEnc(R[30:28]) |
| | B5[4:0] = BoothEnc(R[32:30]) |
| Cycle 5: | No change | where the BoothEnc function is specified by the following table:

| Input bits: | | | Output bits: | | | | |
|---|---|---|---|---|---|---|---|
| 2 | 1 | 0 | 4 | 3 | 2 | 1 | 0 |
| 0 | 0 | 0 | 0 | 0 | 1 | 0 | 0 |
| 0 | 0 | 1 | 0 | 1 | 0 | 0 | 0 |
| 0 | 1 | 0 | 0 | 1 | 0 | 0 | 0 |
| 0 | 1 | 1 | 1 | 0 | 0 | 0 | 0 |
| 1 | 0 | 0 | 0 | 0 | 0 | 0 | 1 |
| 1 | 0 | 1 | 0 | 0 | 0 | 1 | 0 |
| 1 | 1 | 0 | 0 | 0 | 0 | 1 | 0 |
| 1 | 1 | 1 | 0 | 0 | 1 | 0 | 0 |

Multiplier rows 1,2,4 and 5

On all cycles, multiplier row k takes inputs D[32:0], Bk[4:0], AHk[1:0], Sk[32:0] and Ck[32:0] and produces outputs S(k+1)[32:0], C(k+1)[32:0], SLk[1:0] and CLk[1:0] according to the following equations:

First use multiplexers to generate x[33:0] and XC according to the following table:

| Bk | | | | | | | | |
|---|---|---|---|---|---|---|---|---|
| [4] | [3] | [2] | [1] | [0] | X[33] | X[32:1] | X[0] | XC |
| 0 | 0 | 0 | 0 | 1 | NOT(D[32]) | NOT(D[31:0]) | 1 | 1 |
| 0 | 0 | 0 | 1 | 0 | NOT(D[32]) | NOT(D[32:1]) | NOT(D[0]) | 1 |
| 0 | 0 | 1 | 0 | 0 | 0 | 0,0, . . . ,0 | 0 | 0 |
| 0 | 1 | 0 | 0 | 0 | D[32] | D[32:1] | D[0] | 0 |
| 1 | 0 | 0 | 0 | 0 | D[32] | D[31:0] | 0 | 0 |

Then:

| | |
|---|---|
| CLk[0] = | XC; |
| (CLk[1],SLk[0]) = | two bit sum of Sk[0], Ck[0] and X[0]; |
| (C(k+1)[0],SLk[1]) = | two bit sum of Sk[1], Ck[1] and X[1]; |
| For i=2,3, . . . ,32: | |
| (C(k+1)[i−1],S(k+1)[i−2]) = | two bit sum of Sk[i], Ck[i] and X[i]; |
| (S(k+1)[32],S(k+1)[31]) = | two bit sum of AHk[0], NOT(Ck[32]) and NOT(X[33]) |
| C(k+1)[32] = | NOT(AHk[1]) |

Accumulate value high latches
These contain internal signals ACCHI[31:0]

| | |
|---|---|
| Cycle 1: | For i=0,1, . . . ,30: ACCHI[i] = ACCUM AND ACCVAL[i+33] |
| | ACCHI[31] = SIGNED AND ACCUM AND ACCVAL[63] |

-continued

```
             AH1[1:0] = ACCHI[1:0]
             AH2[1:0] = ACCHI[3:2]
             AH4[1:0] = ACCHI[5:4]
             AH5[1:0] = ACCHI[7:6]
Cycle 2:     AH1[1:0] = ACCHI[9:8]
             AH2[1:0] = ACCHI[11:10]
             AH4[1:0] = ACCHI[13:12]
             AH5[1:0] = ACCHI[15:14]
Cycle 3:     AH1[1:0] = ACCHI[17:16]
             AH2[1:0] = ACCHI[19:18]
             AH4[1:0] = ACCHI[21:20]
             AH5[1:0] = ACCHI[23:22]
Cycle 4:     AH1[1:0] = ACCHI[25:24]
             AH2[1:0] = ACCHI[27:26]
             AH4[1:0] = ACCHI[29:28]
             AH5[1:0] = ACCHI[31:30]
Cycle 5:     No change
Carry and save low latches Cycle 1:     SL[7:0] = (SL5[1:0],SL4[1:0],SL2[1:0],SL1[1:0])
             CL[7:0] = (CL5[1:0],CL4[1:0],CL2[1:0],CL1[1:0])
Cycle 2:     SL[15:8] = (SL5[1:0],SL4[1:0],SL2[1:0],SL2[1:0])
             CL[15:8] = (CL5[1:0],CL4[1:0],CL2[1:0],CL1[1:0])
Cycle 3:     SL[23:16] = (SL5[1:0],SL4[1:0],SL2[1:0],SL1[1:0])
             CL[23:16] = (CL5[1:0],CL4[1:0],CL2[1:0],CL1[1:0])
Cycle 4:     SL[31:24] = (SL5[1:0],SL4[1:0],SL2[1:0],SL1[1:0])
             CL[31:24] = (CL5[1:0],CL4[1:0],CL2[1:0],CL1[1:0])
Cycle 5:     No change
Multiplexer B Cycles 1-4:  SF[31:0] = SL[31:0]
             CF[31:0] = CL[31:0]
Cycle 5:     SF[31:0] = S6[31:0]
             CF[31:0] = C6[31:0]
Multiplexer C Cycles 1-4:  CIN = R[0]
Cycle 5:     CIN = NEWC
Carry Latch Cycles 1-3:  No change
Cycle 4:     NEWC = COUT
Cycle 5:     No change
Final adder On all cycles: (COUT, SUM[31:0]) = 33-bit sum of SF[31:0],
CF[31:0] and CIN
Result latches Cycles 1-3:  No change
Cycle 4:     RESULT[31:0] = SUM[31:0]
Cycle 5:     RESULT[63:32] = SUM[31:0]
```

FIGS. 4A and 4B together illustrate a multiply-accumulate circuit for multiplying an M-bit multiplicand (MCAND []) and an N-bit multiplier (MPLIER[]) and then adding a (M+N)-bit accumulate value (ACCVAL[]), in this example M=N=32. The N-bit multiplier is latched within multiplier latches 2 and the M-bit multiplicand is latched within multiplicand latches 4. The lower portion of the (M+N)-bit accumulate value is fed to the carry-save initialiser 6 and the upper portion of the (M+N)-bit accumulate value is fed to accumulate value high latches 8. The carry-save initialiser 6 receives the M-bit multiplicand (D[]) and produces either a bitwise inversion of this zero, depending on whether the value of the bottommost bit of the multiplier latches 2 is one or zero respectively. The result is fed to a multiplexer A 10 to serve as one of the carry value or the save value. The other of the carry value of save value comprises the lowermost bits of the accumulate value.

The N-bit multiplier is also fed to a series of Booth encoders 12 which produce modified Booth summands that are fed to respective ones of the subsequent multiplier rows.

As shown in FIG. 4B, a sequence of multiplier rows 14, 16, 18, 20 are provided that each implement the multiplier algorithm previously discussed. This multiplier algorithm incorporates two bits of the accumulate value on each iteration. Input to each multiplier row 16, 18, 20 on each cycle are a Booth digit (B1[], B2[], B4[], B5[]), bits from the accumulate value stored within the accumulate value high latches 8, bits of the M-bit multiplicand from the multiplicand latches 4 and the save value and carry value from the previous multiplier row either directly or indirectly.

Output from each multiplier row are the lowermost bits (SL,CL) that are no longer changing on subsequent iterations and the current save value and carry value. These lowermost bits are accumulated in the carry and save low latches 24. The save value and carry value (S6[], C6[]) is fed back to the first multiplier row 14 via carry-save latches A 22 and multiplexer A 10. When the final multiplication iteration has been completed, the carry value and save value from the last multiplier row 20 and carry and save low latches 24 are respectively fed to a final adder 26 where they are summed over two cycles (the values from the carry and save low latches 24 being fed to the final adder 26 on the first cycle and the values from the final multiplier row 20 on the second cycle) with the result being stored in result latches 28. A multiplexer C 30 serves to feed in the carry bit R[0] left over from the 1's complement initialisation during the first addition cycle of the final adder 26 and any carry bit as necessary between the first and second cycles of the final adder 26.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

I claim:

1. An electronic multiplying and adding apparatus for multiplying an M-bit multiplicand by an N-bit multiplier and adding an (M+N)-bit accumulate value, said apparatus comprising:

(i) means for generating a sequence of partial summands representing multiplication of said M-bit multiplicand and said N-bit multiplier;

(ii) means for initialising a carry-save partial result as an initialising carry-save cycle;

(iii) means for performing a plurality of carry-save cycles, each carry-save cycle adding one of the partial summands to an input carry-save partial result generated in an immediately preceding carry-save cycle to yield an output carry-save partial result for that carry-save cycle, wherein for each carry-save cycle, said input carry-save partial result has active carry bits that correspond to carry bits in said output carry-save partial result that are dependent upon said partial summand for that carry-save cycle and active save bits that correspond to save bits in said output carry-save partial result that are dependent upon said partial summand for that carry-save cycle a most significant bit of said active save bits having a bit position Y; and (iv) means for adding X bits of said (M+N)-bit accumulate value to said input carry-save partial result on each carry-save cycle at bit positions above a bit position Z, wherein said means for performing a plurality of carry-save cycles increases both Z and Y by X between carry-save cycles.

2. An electronic multiplying and adding apparatus as claimed in claim 1, wherein X=2.

3. An electronic multiplying and adding apparatus as claimed in claim 2, wherein said means for adding adds said X bits of said (M+N)-bit accumulate value to said input carry-save partial result using:

means for extending said output carry-save partial result on a carry-save cycle with extension save bits at bit positions Z+1 and Z+2 and an extension carry bit at bit position Z+2, said extension save bits being given by the sum of:
the $Z+1^{th}$ bit of said (M+N)-bit accumulate value;
the complement of the $Z^{th}$ bit of said active carry bits; and
the complement of the $Z+1^{th}$ bit of said partial summand, and said extension carry bit being given by the complement of the $Z+2^{th}$ bit of said (M+N)-bit accumulate value.

4. An electronic multiplying and adding apparatus as claimed in claim 1, wherein said means for generating comprises a Booth encoder, said sequence of partial summands being a sequence of Booth summands.

5. An electronic multiplying and adding apparatus as claimed in claim 1, wherein M=N.

6. An electronic multiplying and adding apparatus as claimed in claim 5, wherein M=N=32.

7. An electronic multiplying and adding apparatus as claimed in claim 1, said apparatus has one or more data buses for carrying said carry-save partial results between carry-save cycles said one or more data buses having a width of less than N+M bits.

8. An electronic multiplying and adding apparatus as claimed in claim 7, wherein M=N and said one or more data buses have a width of M+3 bits.

9. An electronic multiplying and adding apparatus as claimed in claim 1, wherein said means for generating a sequence of partial summands is operable such that the $Z+1^{th}$ bit of the partial summand is either a zero or a sign extension depending upon a sign selecting input, said M-bit multiplicand and said N-bit multiplier being treated as unsigned or signed numbers respectively in dependence upon said sign selecting input.

10. An integrated circuit central processing unit having a hardware multiplier comprising an electronic multiplying and adding apparatus as claimed in claim 1.

11. An electronic multiplying and adding apparatus as claimed in claim 1 wherein said means for initialising initialises said carry value and said save value to a respective one of:

at least part of said (N+M)-bit accumulate value; and
a first partial summand.

12. A method of multiplying and adding within an electronic multiplying and adding apparatus for multiplying an M-bit multiplicand by an N-bit multiplier and adding an (M+N)-bit accumulate value, said method comprising the steps of:

(i) generating a sequence of partial summands representing multiplication of said M-bit multiplicand and said N-bit multiplier:

initialising a carry-save partial result as an initialising carry-save cycle;

(iii) performing a plurality of carry-save cycles, each carry-save cycle adding a respective one of the partial summands to an input carry-save partial result generated in an immediately preceding carry-save cycle to yield an output carry-save partial result for that carry-save cycle, wherein for each carry-save cycle said input carry-save partial result has active carry bits that correspond to carry bits in said output carry-save partial result that are dependent upon said partial summand for that carry-save cycle and active save bits that correspond to save bits in said output carry-save partial result that are dependent upon said partial summand for that carry-save cycle, a most significant bit of said active save bits having a bit position Z and a least significant bit of said active save bits having a bit position Y; and (iv) adding X bits of said (M+N)-bit accumulate value to said input carry-save partial result on each carry-save cycle at bit positions above bit position Z, wherein said performing step is such that Z and Y both increase by X between carry-save cycles.

13. A method of multiplying and adding as claimed in claim 12, wherein X=2.

14. A method of multiplying and adding as claimed in claim 12, wherein said step of adding comprises:

extending said output carry-save partial result on a carry-save cycle with extension save bits at bit positions Z+1 and Z+2 and an extension carry bit at bit position Z+2, said extension save bits being given by the sum of:
the $Z+1^{th}$ bit of said (M+N)-bit accumulate value;
the complement of the $Z^{th}$ bit of said active carry bits; and
the complement of the $Z+1^{th}$ bit of said partial summand, and said extension carry bit being given by the complement of the $Z+2^{th}$ bit of said (M+N)-bit accumulate value.

15. A method of multiplying and adding as claimed in claim 12 wherein said step of initialising initialises said carry value and said save value to a respective one of:

a least part of said (N+M)-bit accumulate value; and
a first partial summand.

16. An electronic multiplying and adding apparatus for multiplying an M-bit multiplicand by an N-bit multiplier and adding an (N+M)-bit accumulate value, said apparatus comprising:

(i) means for generating a sequence of partial summands representing multiplication of said M-bit multiplicand and said N-bit multiplier;

(ii) means for initialising as an initialising carry-save cycle a carry value and a save value to a respective one of:
at least part of said (N+M)-bit accumulate value; and
a first partial summand; and (iii) means for performing a plurality of carry-save cycles, each carry-save cycle adding one of the partial summands to an input carry-save partial result generated in an immediately preceding carry-save cycle to yield an output carry-save partial result for that carry-save cycle, wherein said input carry-save partial result and said output carry-save partial result each comprises said carry value and said save value.

17. An electronic multiplying and adding apparatus as claimed in claim 16, wherein said means for generating comprises a modified Booth encoder, said sequence of partial summands being a sequence of modified Booth summands.

18. An electronic multiplying and adding apparatus as claimed in claim 17, wherein, said modified Booth encoder is operable such that when said N-bit multiplier is unsigned, respective bits R[a] of an internal multiplier representing said N-bit multiplier are given by:

R[(N−1) to 0] are equal to corresponding bits of said N-bit multiplier, and

R[N] is equal to zero.

19. An electronic multiplying and adding apparatus as claimed in claim 17, wherein, said modified Booth encoder is operable such that when said N-bit multiplier is signed, respective bits R[a] of an internal multiplier representing said N-bit multiplier are given by:

R[(N−1) to 0] are equal to corresponding bits of said N-bit multiplier,
and
R[N] is equal to R[(N−1)].

20. An electronic multiplying and adding apparatus as claimed in claim 19, wherein, said modified Booth encoder is operable such that if R[0] is equal to zero, then said first partial summand is initialised to zero.

21. An electronic multiplying and adding apparatus as claimed in claim 19, wherein, said modified Booth encoder is operable such that if R[0] is equal to one, then said first partial summand is initialised to a bitwise inverse of said M-bit multiplicand with a one being added later.

22. An electronic multiplying and adding apparatus as claimed in claim 21, comprising a final adder for adding said carry value and said save value, a carry-in bit for said final adder being set to R[0].

23. A method of multiplying and adding within an electronic multiplying and adding apparatus for multiplying an M-bit multiplicand by an N-bit multiplier and adding an (M+N)-bit accumulate value, said method comprising the steps of:

(i) generating a sequence of partial summands representing multiplication of said M-bit multiplicand and said N-bit multiplier;

(ii) initialising as an initialising carry-save cycle a carry value and a said save value to a respective one of:
at least part of said (N+M)-bit accumulate value; and
a partial summand; and (iii) performing a plurality of carry-save cycles, each carry-save cycle adding a respective one of the partial summands to an input carry-save partial result generated in an immediately preceding carry-save cycle to yield an output carry-save partial result for that carry-save cycle, wherein said input carry-save partial result and said output carry-save partial result each comprising said carry value and said save value.

* * * * *